Figure 1:
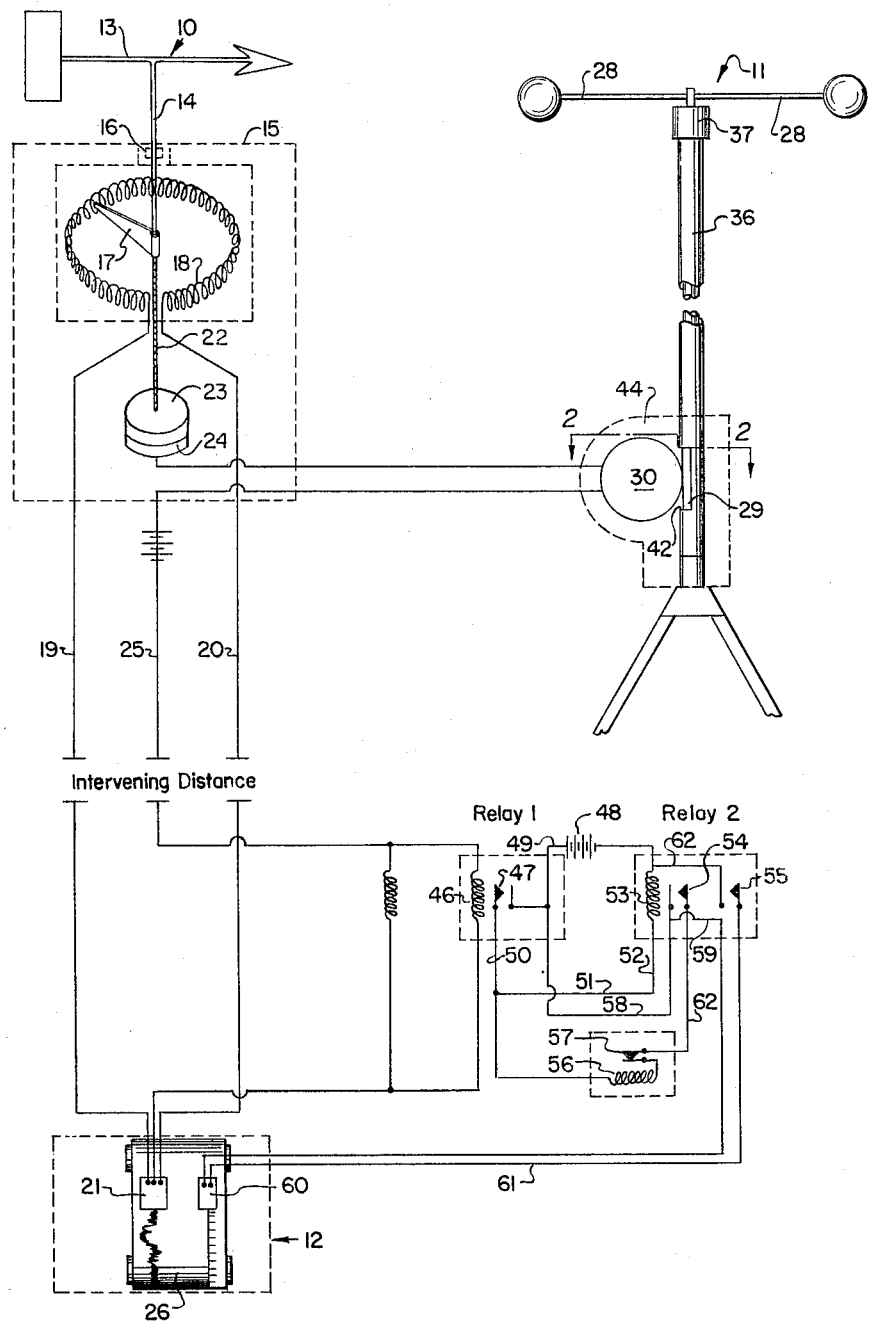

Nov. 22, 1966    A. B. STOUT, JR    3,286,521
WIND DIRECTION AND VELOCITY RECORDING SYSTEM
Filed March 26, 1964    2 Sheets-Sheet 1

INVENTOR.
ALLISON B. STOUT Jr.
BY Mallinckrodt and Mallinckrodt
ATTORNEYS

Nov. 22, 1966  A. B. STOUT, JR  3,286,521
WIND DIRECTION AND VELOCITY RECORDING SYSTEM
Filed March 26, 1964  2 Sheets-Sheet 2
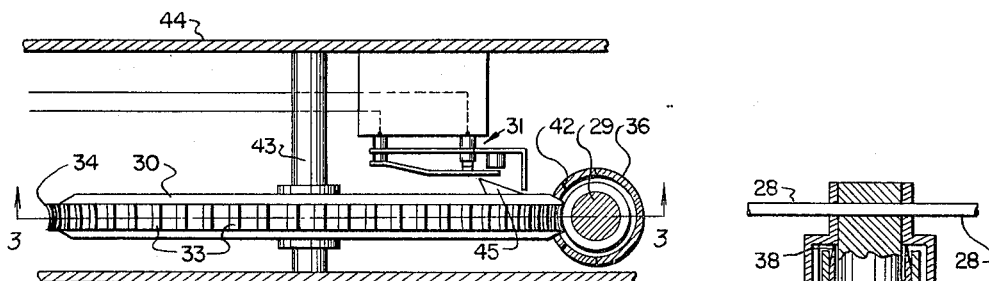
FIG. 2
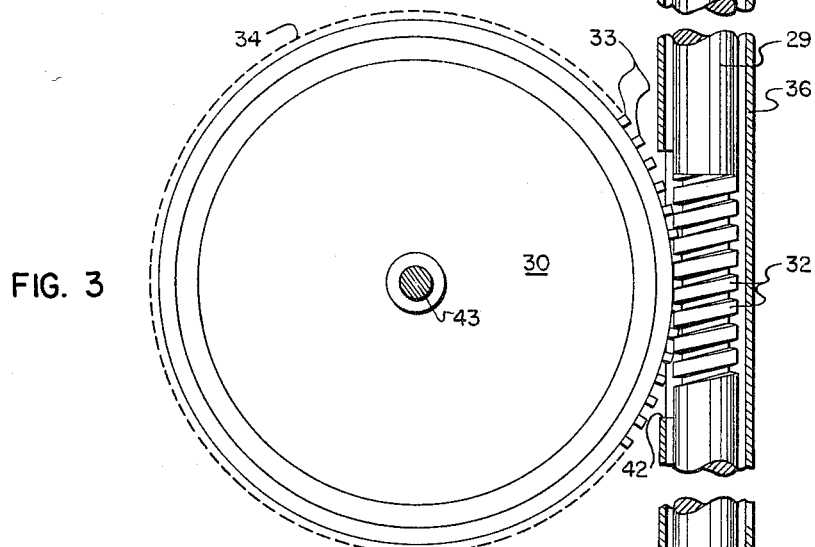
FIG. 3
FIG. 4
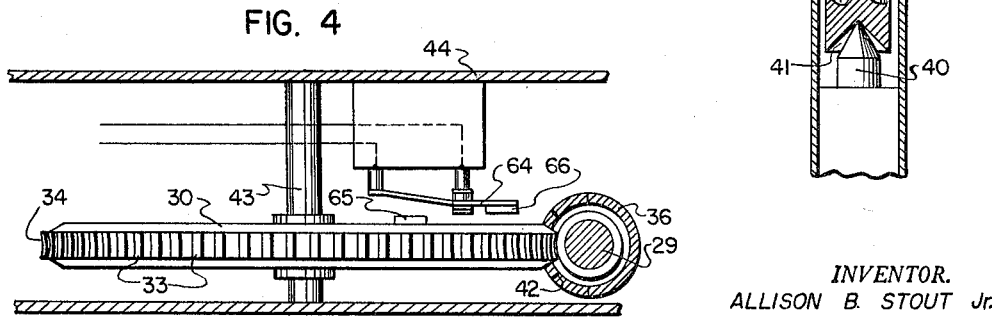
INVENTOR.
ALLISON B. STOUT Jr.
BY Mallinckrodt and Mallinckrodt
ATTORNEYS

United States Patent Office 3,286,521
Patented Nov. 22, 1966

3,286,521
WIND DIRECTION AND VELOCITY RECORDING SYSTEM
Allison B. Stout, Jr., Salt Lake County, Utah, assignor to Kennecott Copper Corporation, New York, N.Y., a corporation of New York
Filed Mar. 26, 1964, Ser. No. 354,970
6 Claims. (Cl. 73—189)

This invention relates to wind direction and velocity sensing apparatus and more particularly to apparatus for sensing low magnitude air movement and for transmitting the data obtained to a remote recording device.

In recent years there has been an increasing awareness of the discomforts and health hazards due to contaminated air. This is especially true in densely populated areas where large numbers of automobiles and industrial plants contribute vast amounts of noxious fumes and irritating solids to the atmosphere. As a result there have been both large and small scale attempts at air purification, particularly by governments and business. Since a prerequisite of any successful pollution abatement program is a determination of the source of contaminants, and since the determination can be made only with an accurate knowledge of air movement, the need for simplified and accurate equipment for gathering the data becomes quite apparent. Equipment provided heretofore has been complicated and subject to various functional limitations.

It is a primary object of the present invention to provide simple and reliable apparatus rugged enough to withstand operation in high velocity winds frequently encountered on mountain peaks, and yet sensitive enough to accurately indicate wind direction and velocity when the air movement is so slow as to be hardly noticeable, i.e. in the order of one-fourth mile per hour.

It is also an object of this invention to provide apparatus for economically transmitting signals representative of the indicated wind direction and wind velocity from a location, such as a mountain peak, to a remotely positioned recorder, where the data thus obtained and transmitted is recorded for analysis by properly qualified persons.

To achieve the foregoing objects, I employ a wind-vane-operated potentiometer for continuously indicating wind direction, a sealed and highly sensitive anemometer to continuously indicate wind velocity and to operate a switch, and a three wire transmission circuit interconnecting the potentiometer and the switch with a remote recorder. I also utilize a holding circuit for insuring proper marking of the recorder chart in response to signals resulting from the opening of the anemometer-operated switch and indicative of wind velocity.

There is shown in the accompanying drawings specific embodiments of the invention representing what are presently regarded as the best modes of carrying out the generic concepts in actual practice. From the detailed description of these presently preferred forms of the invention, other more specific objects and features will become apparent.

In the drawings:

FIG. 1 is a schematic representation of the wind direction indicator, anemometer, recorder, and transmission circuit of the invention;

FIG. 2, a horizontal section taken on line 2—2 of FIG. 1, and drawn to an enlarged scale, showing a preferred form of anemometer and anemometer switch, with the housing therefor shown fragmentarily;

FIG. 3, a vertical section through the anemometer taken on line 3—3 of FIG. 2; and FIG. 4, a view similar to FIG. 2, but showing another embodiment of anemometer switch.

Referring now to the drawings:

In the illustrated preferred embodiment, a wind vane 10 and an anemometer 11 are positioned remote from a conventional ratio-resistance bridge recorder 12, such as, for example, a Speedomax H Recorder, manufactured by Leeds and Northrup Co., Philadelphia, Pennsylvania.

Wind vane 10 has the usual wind-direction-indicating member 13 supported on a shaft 14. Shaft 14 extends through and is journaled by housing 15, as at 16, and is freely rotatable with indicating member 13.

A contact arm 17 is fixed to and rotates with shaft 14 and serves as a center tap for an annular potentiometer coil 18 located within housing 15. The respective ends of the potentiometer coil are attached to transmission wires 19 and 20, leading to pen 21 of recorder 12.

Contact arm 17 is connected to one end of wire 22, the other end of which is connected to a movable slip-ring 23. Such slip-ring 23 is fixed to and is rotatable wth shaft 14 and is also electrically connected to fixed slip-ring 24. Thus, contact arm 17 is freely rotatable, and electricity transmitted through the contact arm, wire 22, and slip-ring 23 is further transmitted through slip-ring 24 and transmission line 25 to actuate pen 21 of recorder 12.

The position of contact arm 17 relative to potentiometer coil 18 regulates the amount of current flowing through each of the circuit branches, including the respective transmission lines 19 and 20, and this differential current flow determines, in customary manner, the position of the marker pen 21 on continuously driven chart 26, to provide a continuous indication of wind direction.

Wind velocity is measured by anemometer 11. Each time one mile of wind passes the anemometer, cup arms 28 and threaded support staff 29 are rotated sufficiently to turn disc 30 one complete revolution, thereby opening and closing the associated and normally closed switch 31 once. The driving connection between staff 29 and disc 30 comprises a continuous spiral thread 32 on staff 29, acting as a worm gear and being arranged to mesh with corresponding pitched gear teeth 33 formed on the outer periphery 34 of disc 30. The number of times the staff 29 must rotate before disc 30 completes one revolution is dependent upon their relative diameters and the particular gear ratios employed. To insure meshing of gears 32 and 33, the outer periphery 34 is inwardly curved in conformance with the circumference of staff 29.

Continuous, free rotation of anemometer staff 29 is insured by protecting it with a tubular casing 36 and by a cap 37, which is fixed to staff 29 so that it skirts the top opening of the casing. Cap 37 rotates with staff 29, and a circular, knife-edge bearing 38, preferably of "Teflon" type plastic press fitted within casing 36, prevents dust getting into the casing to adversely affect operation of the staff.

Another circular, knife-edge bearing 39 maintains staff 29 in a central position while insuring free rotation thereof within the casing 36, and a needle bearing 40, also of "Teflon" type plastic, extends into recess 41 to support the staff from the bottom and to provide a bearing surface to facilitate rotation. Since staff 29 extends downwardly around bearing 40, dust cannot readily accumulate in recess 41 and the bearing surfaces remain substantially dust free.

An opening 42 is provided in casing 36, through which the outer periphery 34 of disc 30 extends to mesh with worm gear 32 of staff 29. Disc 30 is journaled on a central axle 43, and the axle is fixed within housing 44.

Rotation of disc 30 moves cam 45—fixed thereto—to momentarily open the spring contact of a switch 31, which is connected in transmission line 25 and is normally biased to closed position. This momentarily interrupts the current through relay coil 46 positioned in transmission line 25. De-energization of coil 46 allows relay contact 47 to close and complete a circuit from power source 48 through line 49, relay contact 47, lines 50, 51 and 52, and relay coil 53.

Energization of relay coil 53 closes contacts 54 and 55 and completes a holding circuit for relay coil 53 from power source 48 through lines 52 and 51, coil 56, switches 57 and 54, and lines 58 and 49. At the same time a circuit is completed through lines 49, 58, 59, pen 60, line 61, contact 55, and lines 62 and 51, to move pen 60 on chart 26. The frequency of marks made by pen 60 is indicative of the speed, i.e., miles per unit time, of wind passing the anemometer.

The holding circuit, above-described, insures continued closure of relay contacts 54 and 55 until pen 60 has had time to properly mark the chart. After a predetermined time interval, time delay relay coil 56 is heated sufficiently to open contact 57, thereby-de-energizing coil 53, interrupting current flow to pen 60, and placing the circuit in its dormant state ready for another opening of switch 31.

Wind direction is constantly recorded by pen 21, as previously described, with but momentary interruptions due to the rapid opening and closing action of switch 31 by cam 45. These interruptions are so brief, that the overall pattern recorded by pen 21 on the chart appears substantially continuous. At the same time, wind velocity, as measured by rotation of anemometer cup-arms 28, is recorded by marks made by pen 60.

Another form of switch usable with anemometer 11 to create the signals necessary for operation of pen 60 is shown in FIG. 4. In this embodiment the spring contact 64 is normally biased closed, but whenever disc 30 completes a revolution and magnet 65 fixed thereto passes beneath magnet 66 on the spring contact of the switch, the two which have the same polarity, tend to repel each other, thereby momentarily opening the switch.

Whereas there are here illustrated and specifically described certain preferred constructions of apparatus which are presently regarded as the best mode of carrying out the invention, it should be understood that various changes may be made and other constructions adopted without departing from the inventive subject matter particularly pointed out and claimed herebelow.

I claim:

1. A wind direction and velocity recording system, comprising: means, including a potentiometer, a wind-vane, and a potentiometer tap movable by said wind-vane to constantly indicate wind direction; a line supplying power for said potentiometer; means including a normally closed switch in said power line, and an anemometer for repeatedly momentarily opening the normally closed switch to constantly signal wind velocity; a recorder; means for recording said potentiometer tap position on said recorder; and means for recording signaled wind velocity on the recorder.

2. A wind direction and velocity recording system comprising: a potentiometer, including a coil and a movable center tap; a directional recorder marker; transmission lines interconnecting the ends of said potentiometer coil and said directional recorder marker; another transmission line interconnecting said directional recorder marker and said movable center tap, whereby the directional recorder marker is moved in accordance with proportionate current flow through the transmission lines connected to the ends of the potentiometer; a normally closed switch in the transmission line interconnecting said directional recorder marker and the movable center tap; a rotatably mounted lisc; a cam on said disc, said disc and said cam being positioned such that one revolution of the disc will move the cam to momentarily open the normally closed switch one time; a rotatably mounted staff; a continuous thread forming a worm gear on said staff; gear teeth on the periphery of the disc, said staff and said disc being arranged such that the worm gear on the shaft constantly meshes with the gear teeth on the disc; anemometer cup-arms fixed to said staff and rotatable therewith; a velocity recorder marker; and control means, responsive to opening of said switch, to actuate said velocity recorder marker.

3. A wind direction and velocity recording system according to claim 2, wherein the control means for actuating the velocity recorder marker includes a biased-closed switch, held open by current flow through the potentiometer; self-energizing holding circuit means, including a time delay relay, energized by momentary closing of the switch held open by current flow through the potentiometer; a source of power; and circuit means interconnecting the source of power and said velocity recorder marker during energization of said holding circuit, said time delay relay opening after a predetermined period of time to break the holding circuit means.

4. An anemometer, comprising:
a casing;
a staff extending downwardly into said casing;
a needle bearing fixed in said housing and supporting said staff;
a skirt portion formed on the bottom of said staff and extending downwardly around said needle bearing;
a cap fixed to said staff and depending downwardly around the said casing;
a knife-edge bearing carried by the casing, surrounding the staff, and having a knife-edge portion in engagement with the cap to provide a seal therebetween and another knife-edge portion in engagement with the staff to maintain the staff centered and to provide a seal between the staff and the casing;
cup arms carried by the staff, said cup arms and said staff being rotatable by wind;
a continuous spiral thread forming a gear on said staff;
a circular disc having teeth formed on its periphery;
means mounting the disc for continuous engagement of said gear teeth with the spiral thread on the staff; and
means for signalling rotation of the disc in response to rotation of the shaft.

5. An anemometer according to claim 4, wherein the means for signalling rotation of the disc includes
a cam carried by one face of the circular disc; and
a normally closed switch positioned to be opened when contacted by the said cam.

6. An anemometer according to claim 4, wherein, the means for signalling rotation includes
a switch including a movable contact member having a magnetic member thereon; and
a magnetic member carried by a face of the disc to cooperate with the magnetic member on the movable contact in moving the movable contact.

References Cited by the Examiner

UNITED STATES PATENTS

| | | | |
|---|---|---|---|
| 2,474,244 | 6/1949 | Grieg. | |
| 3,094,869 | 6/1963 | Wehmann | 73—189 |
| 3,119,260 | 1/1964 | Karmin | 73—189 |
| 3,119,261 | 1/1964 | Bonanno | 73—189 |

RICHARD C. QUEISSER, *Primary Examiner.*

J. W. MYRACLE, *Assistant Examiner.*